(12) United States Patent
Wolf et al.

(10) Patent No.: US 8,693,681 B2
(45) Date of Patent: Apr. 8, 2014

(54) KASUMI CIPHER EXECUTABLE INSTRUCTIONS AND CIRCUITRY

(75) Inventors: Tod David Wolf, Richardson, TX (US); David John Hoyle, Austin, TX (US)

(73) Assignee: Texas Instruments Incorporated, Dallas, TX (US)

( * ) Notice: Subject to any disclaimer, the term of this patent is extended or adjusted under 35 U.S.C. 154(b) by 681 days.

(21) Appl. No.: 12/332,306

(22) Filed: Dec. 10, 2008

(65) Prior Publication Data

US 2010/0142702 A1    Jun. 10, 2010

(51) Int. Cl.
*H04L 9/06* (2006.01)
(52) U.S. Cl.
USPC .......................................................... 380/29
(58) Field of Classification Search
None
See application file for complete search history.

(56) References Cited

U.S. PATENT DOCUMENTS 7,027,598 B1 * 4/2006 Stojancic et al. ............... 380/28

OTHER PUBLICATIONS

Universal Mobile Telecommunications System (UMTS): Specification of the 3GPP confidentiality and integrity algorithms; Document 1: f8 and f9 specification, Version 7.0.0 Release 7, ETSI TS 135 201 V7.0.0 (ETSI, 2007).
Universal Mobile Telecommunications System (UMTS): Specification of the 3GPP confidentiality and integrity algorithms; Document 2: Kasumi specification, Version 7.0.0 Release 7, ETSI TS 135 202 V7.0.0 (ETSI, 2007).
Matsui et al., "Misty, Kasumi and Camellia Cipher Algorithm Development", Advance, vol. 100 (Mitsubishi Electric, 2002), pp. 2-8.

* cited by examiner

*Primary Examiner* — Gilberto Barron, Jr.
*Assistant Examiner* — Malcolm Cribbs
(74) *Attorney, Agent, or Firm* — Ronald O. Neerings; Wade James Brady; Frederick J. Telecky, Jr.

(57) ABSTRACT

Logic circuitry and corresponding software instructions for performing functions within the FL function of a Kasumi cipher. An RLAX logic circuit includes a bit-wise AND function, a reorder bus, and a bit-wise exclusive-OR function for generating a destination word from corresponding logic functions of portions of first and second operands, in executing an RLAX program instruction. An RLOX logic circuit includes a bit-wise OR function, a reorder bus, and a bit-wise exclusive-OR function for generating a destination word from corresponding logic functions of portions of first and second operands, in executing an RLOX program instruction. Plural instances of the logic circuits can be implemented in parallel, to simultaneously operate upon plural data blocks.

31 Claims, 11 Drawing Sheets

KASUMI CIPHER EXECUTABLE INSTRUCTIONS AND CIRCUITRY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Embodiments of this invention are in the field of digital logic, and are more specifically directed to programmable logic suitable for use in encryption and decryption according to the Kasumi cipher.

High-speed data communication services are now commonly available for mobile telephone devices. For example, the combination of the well-known "3G" (3rd Generation) mobile services with the increased computational capacity of modern logic circuits has enabled modern high-performance mobile telephones to provide full wireless Internet access (i.e., as opposed to being limited to "mobile" webpages), and wireless downloading and enjoyment of multimedia content.

The 3G mobile wireless services are commonly carried out under a set of standards promulgated by The 3rd Generation Partnership Project ("3GPP"), which is an initiative of the European Telecommunications Standards Institute ("ETSI"). These standards and technical specifications for 3G wireless services include normative encryption and decryption algorithms for confidentiality and integrity (i.e., authentication), such algorithms referred to as the "f8" and "f9" algorithms, respectively. These normative algorithms are described in *Universal Mobile Telecommunications System (UMTS): Specification of the 3GPP confidentiality and integrity algorithms; Document 1: f8 and f9 specification*, Version 7.0.0 Release 7, ETSI TS 135 201 V7.0.0 (ETSI, 2007), incorporated herein by this reference. As stated in that specification, encryption and decryption under the f8 (confidentiality) and f9 (integrity) algorithms utilize the "Kasumi" block cipher. As known in the art, block ciphers are encryption approaches that encrypt a message by transforming a fixed-length data block of a given size, into a fixed-length block of that same size, by applying a key. The key is a specific data block of a particular size, the contents of which are known to the encrypting party and to the decrypting part. The Kasumi block cipher, in its context as applied in the 3GPP f8 and f9 algorithms, is described in *Universal Mobile Telecommunications System (UMTS): Specification of the 3GPP confidentiality and integrity algorithms; Document 2: Kasumi specification*, Version 7.0.0 Release 7, ETSI TS 135 202 V7.0.0 (ETSI, 2007), incorporated herein by this reference.

In a general sense, the Kasumi cipher is of the class of block ciphers referred to as "Feistel" ciphers. Feistel ciphers are a class of iterated block ciphers in which the encrypted "text" is calculated from its "plaintext" by repeatedly applying the same transformation. In general, Feistel ciphers break the data being encrypted into two halves, and break the "key" into subkeys. In each but the last one of multiple "rounds", the appropriate transformation function is applied to one half of the input block using a subkey, with the result exclusive-ORed with the other half, and the two halves of the input block are then swapped. The last "round" applies the same transformation, but without the swapping of the end result. Decryption follows the same approach, structurally, but the subkeys are applied in reverse order from the order applied in encryption. The f8 and f9 algorithms apply the Kasumi cipher within different higher-level algorithms from one another.

The data flow of the f8 confidentiality algorithm is illustrated in FIG. 1a. According to the f8 3GPP specification, control word 2 includes various control information including such information as the bearer and direction of the communication, and optional information including the length of the payload bitstream. The f8 algorithm produces a keystream KS from control word 2 that is applied to the input bitstream IBS, which is the input payload data to be encrypted. Control word 2 is applied to Kasumi algorithm instance $5_0$ along with the confidentiality key CK, exclusive-OR modified by a key modifier KM. The output of this first Kasumi algorithm instance $5_0$ is stored in sixty-four bit register A. Keystream KS is then generated in sixty-four bit blocks from the contents of register A, by separate Kasumi algorithm instances $5_1$ through $5_N$. Kasumi algorithm instance $5_1$ exclusive-ORs the contents of register A with a block count value BLKCNT=0, to produce a first sixty-four bit block of the output keystream KS. Subsequent keystream KS blocks are recursively produced from the exclusive-OR of the previous keystream KS block with the result of the exclusive-OR function of the contents of register A block with the corresponding block count value BLKCNT:

$$KS_k = KASUMI[A \oplus BLKCNT \oplus KS_{k-1}]$$

where the index k is the block of the output keystream. In function 7, blocks of the keystream KS are each bit-wise exclusive-ORed with a corresponding block of input bitstream IBS to produce the eventual output bitstream OBS.

FIG. 1b illustrates the data flow of the f9 integrity function according to the 3GPP specification. According to this conventional algorithm, input message 6 includes control information (e.g., the fields COUNT, FRESH, DIRECTION, etc.) and also the payload data (i.e., the field MESSAGE). Input message 6 is parsed into blocks of sixty-four bits each, and the blocks are applied to a corresponding Kasumi algorithm instance 9, along with a corresponding integrity key IK. The output of first Kasumi instance $9_0$ based on first block $PS_0$ of input message 6 is forwarded to an exclusive-OR function $10_1$, for combination with a next block $PS_1$ of input message 6 prior to application to Kasumi instance $9_1$; this output is also bit-wise exclusive-ORed with the output of Kasumi instance $9_1$, by function $12_1$; the output of exclusive-OR function $12_1$ is then applied to next exclusive-OR function $12_2$, for combination with the output of Kasumi instance $9_2$, and so on. This interconnection of Kasumi instances 9 with corresponding exclusive-OR functions 10, 12 continues to the final block $PS_{BLOCKS-1}$ of input message 6 and its Kasumi instance $9_N$. The output of final exclusive-OR function $12_N$ associated with Kasumi instance $9_N$ is applied to Kasumi instance 11, along with the exclusive-OR of integrity key IK with key modifier KM, to produce the output message authentication code MAC-I, which is compared against an expected value to determine if the integrity of the message is valid.

Each Kasumi instance 5, 9 in the f8 and f9 algorithms is an instance of the well-known Kasumi cipher. FIG. 1c illustrates an example of the Kasumi algorithm, in the form of an eight "round" cipher; as known in the art, the number of such rounds can vary. In the Kasumi instance illustrated in FIG. 1c, a sixty-four bit input word 15 is split into two thirty-two bit halves, namely left half L0 and right half R0. In the first round, left half L0 is applied to FL function FL1, for combination with subkey KL1, and then to FO function FO1, for combination with subkeys KO1, KI1. The output of FO function F01 is bit-wise exclusive-ORed with right half R0 of input word 15, and the result applied to FO function FO2 in the second round. FO function FO2 combines the result of the first round with subkeys KO2, KI2, and its result is then combined with subkey FL2 by FL function FL2. The output of FL function FL2 is exclusive-ORed with left half LO of input word 15, and the result applied to the input of FL function FL3 to begin the third round. This operation continues for eight rounds, such that output word 18 is constructed as the concatenation of left half result L8, which is the result of the exclusive-OR of the output of the sixth round and the output of FL function FL8 of the last round, and right half result R8, which is the result of the exclusive-OR of the output of the fifth round and the output of FO function F07.

FIG. 1d illustrates the conventional operation of the FO function, which is performed in each of the eight rounds of the algorithm of FIG. 1c. Thirty-two bit input word 30 is treated by the FO function as two sixteen-bit halves. Subkeys KO, K1 are forty-eight bit subkeys that the FO function subdivides into three sixteen-bit subkeys. The left-hand half of input word 30 is bit-wise exclusive-ORed (XOR function $32_1$) with subkey KO1, and then applied to FI function $31_1$, along with subkey KI1; The output of FI function $31_1$ is exclusive-ORed with the right-hand half of input word 30 by exclusive-OR function $32_2$. The output of XOR function $32_2$ is exclusive-ORed with subkey KO3 (XOR function $32_4$), and the result applied to FI function $31_3$ along with subkey KI3. On the right-hand side, the right-hand half of input word 30 is exclusive-ORed with subkey KO2 (XOR function $32_2$), and the result applied to FI function $31_2$ with subkey KI2. The output of FI function $31_2$ is exclusive-ORed (XOR function $32_6$) with the output of exclusive-OR function $32_2$. Output word 33 is the concatenation of the output of XOR function $32_6$, as its left half, and the exclusive-OR (XOR function $32_5$) of the output of FI function $31_3$ and the output of XOR function $32_6$, the result being the right half of output word 33.

FIG. 1e illustrates the conventional operation of the FL function, as performed within the FO function of FIG. 1d. The FL function splits a sixteen-bit input word 35 into a more significant nine-bit portion and a less significant seven-bit portion. The nine-bit portion is applied to look-up table S9, which returns a pseudo-random nine-bit value that is bit-wise exclusive-ORed with the seven bit portion of input word 35 (two leading zeros added), by XOR function $37_0$. This result is exclusive-ORed with nine-bit subkey KI2 (XOR function $37_1$), and the result applied to another instance of nine-bit look-up table S9. The seven-bit portion of input word 35 is applied to look-up table S7 to return a seven-bit pseudo-random number that is exclusive-ORed with a seven-bit subkey KI1 (XOR function $37_3$). This result is exclusive-ORed with the least-significant seven bits of the output of XOR function $37_0$, and the seven-bit result applied to look-up table S7. The output of the second instance of look-up table S7 (with two leading zeros added) is exclusive-ORed with the output of the second instance of look-up table S9 (XOR function $37_2$), and the result becomes the least-significant nine-bits of output word 45. Conversely, the seven least significant bits of the output of XOR function $37_2$ are exclusive-ORed with the output of the second instance of look-up table S7 (XOR function $37_5$), with the result becoming the most-significant seven bits of output word 45.

FIG. 1f illustrates the conventional operation of operation of the FO function, which is performed in each of the eight rounds of the algorithm of FIG. 1c. Thirty-two bit input word 20 (corresponding, for example, to one "half" of input word 15 to the overall Kasumi instance, or to the output of one of the rounds thereof) is split into two sixteen-bit halves, as is thirty-two bit subkey $KL_i$. A left-hand half of input word 20 is applied to the input of bitwise AND function, along with a left-hand half $KL_{i,1}$ of subkey $KL_i$. The output of AND function 21 is rotated left by one bit, by rotate function 23, and applied to one input of exclusive-OR function 24, which performs a bit-wise exclusive-OR with the right-hand half of input word 20. The output of exclusive-OR 24 is applied to the input of bitwise OR function 25, as is the right-hand half $KL_{i,2}$ of subkey $KL_i$. The output of OR function 25 is rotated left by one bit, by rotate function 27, and is applied to an input of exclusive-OR function 28. XOR function 28 performs a bit-wise exclusive-OR of the output of rotate function 27 and the original left-hand half of input word 20. Output word 22 is the concatenation of the output of exclusive-OR function 28 and the output of exclusive-OR function 24.

It has been observed, according to this invention, that the FL function applied in the Kasumi cipher is quite cumbersome, even using modern high-performance programmable logic. To illustrate this, the FL function of FIG. 1d can be expressed in the C programming language as:

```
B0 = I & KL
B1 = B0 >> 16
B2 = B1 >> 15
B3 = B1 << 1
B4 = B3 | B2
B5 = B4 ^ I
B6 = B5 & 0x0000FFFF
C0 = B6 | KL
C1 = B6 & 0x0000FFFF
C2 = C1 >> 15
C3 = C1 << 1
C4 = C3 | C2
C5 = C4 << 16
C6 = I1 ^ C5
C7 = C6 & 0XFFFF0000
O = C7 | B6
```

In this C code, I refers to thirty-two bit input word 20, O refers to thirty-two bit output word 22, and KL refers to thirty-two bit subkey $KL_i$; all operations are thirty-two bit operations in this code. FIG. 1f correlates the operands in the illustrated FL data flow with the B, C register locations of the C code above. As evident from this C code expression of the conventional approach to the FL function, the number of instructions and machine cycles required to execute the FL function is substantial. Even using modern digital signal processors (DSPs), such as the TMS320C64x family of DSPs, the machine time required to perform these operations can be a limiting factor in the efficiency of the overall system, considering that each block of data must be processed through the f8 and f9 algorithms, both at the transmitter end and also at the receiver. One can tabulate the computational effort for one instance of the FL function as follows:

| Function (C64x instruction) | Number of executions per FL function |
|---|---|
| Bitwise AND | 4 |
| Bitwise OR | 4 |
| Bitwise XOR | 2 |
| Unsigned shift right | 3 |
| Shift left | 3 |
| Total # of instructions | 16 |

As discussed above, each round of a Kasumi instance includes an FL function, an FO function, and an XOR function. Allowing thirty-three instructions as necessary to perform the combination of the FO and XOR functions, then each Kasumi round will require 33+16=49 instructions to execute. The eight rounds of a Kasumi instance thus requires 49*8=392 instructions, or machine cycles, to perform. And for a message of typical length to be processed by the f8 and f9 algorithms described above, 314 Kasumi instances are executed, which amounts to the execution of 314*392=123, 088 instructions. Considering that the Kasumi instructions are in the critical data path in conventional 3G wireless communications, this computational effort is a significant load on the computational capacity of the communications hardware, especially in order to process the signals and corresponding data in real time. In addition, considering that these communications systems are intended for wireless, portable, applications, and because therefore battery life and thus power consumption are of concern, the power required to carry out such a large number of instructions for each data block is less than optimal.

BRIEF SUMMARY OF THE INVENTION

Embodiments of this invention provide a system, method, and instruction capability to perform the FL function of the Kasumi cipher in a reduced number of instructions and machine cycles.

Embodiments of this invention provide such a system, method, and instruction capability that minimizes the machine cycle latency of the FL function.

Embodiments of this invention provide such a system, method, and instruction capability that can be used in place of calculations in general arithmetic and logic instructions.

Embodiments of this invention provide such a system, method, and instruction capability that can be efficiently implemented into programmable digital logic, by way of instructions and dedicated logic for executing those instructions.

Embodiments of this invention provide such a system, method, and instruction capability that can readily be implemented in a parallel fashion, so as to perform the FL function in parallel on multiple data words.

Other objects and advantages of this invention will be apparent to those of ordinary skill in the art having reference to the following specification together with its drawings.

Embodiments of the invention may be implemented into a pair of instructions executed by programmable digital logic circuitry, and into a circuit within such digital logic circuitry. Each of the instructions specifies two source operands, and a destination for the result. One of the instructions performs a bitwise AND of half of each of the two source operands, followed by a one-bit left rotation and an exclusive-OR of the result with a second half of one of the source operands. The other instruction performs a bitwise OR of half of each of its two source operands, followed by one-bit left rotation and an exclusive-OR of the result with a second half of one of the source operands. The instructions may be used in a sequence with one another to carry out successive rounds of a Kasumi cipher.

Embodiments of the invention may also be implemented in circuitry for executing these instructions. In each case, the circuitry includes a bitwise OR or bitwise AND function (depending on the particular one of the instruction pair), followed by a single-bit reordering of the contents by way of hardwired conductor routing. In each case, a bit-wise XOR function follows the reordering routing.

The embodiments of the invention implemented in the circuitry for executing the instructions can be arranged in a parallel fashion, thus performing multiple Kasumi functions in parallel.

DETAILED DESCRIPTION OF THE INVENTION

The invention will be described in connection with its preferred embodiment, namely as implemented into programmable digital signal processing circuitry in a communications transceiver such as a wireless mobile telephone handset. However, it is contemplated that this invention will also be beneficial when implemented into other devices and systems, including a base station transceiver for wireless communications and the like, and when used in other applications that utilize the types of calculations performed by this invention. Accordingly, it is to be understood that the following description is provided by way of example only, and is not intended to limit the true scope of this invention as claimed.

Figure 2:
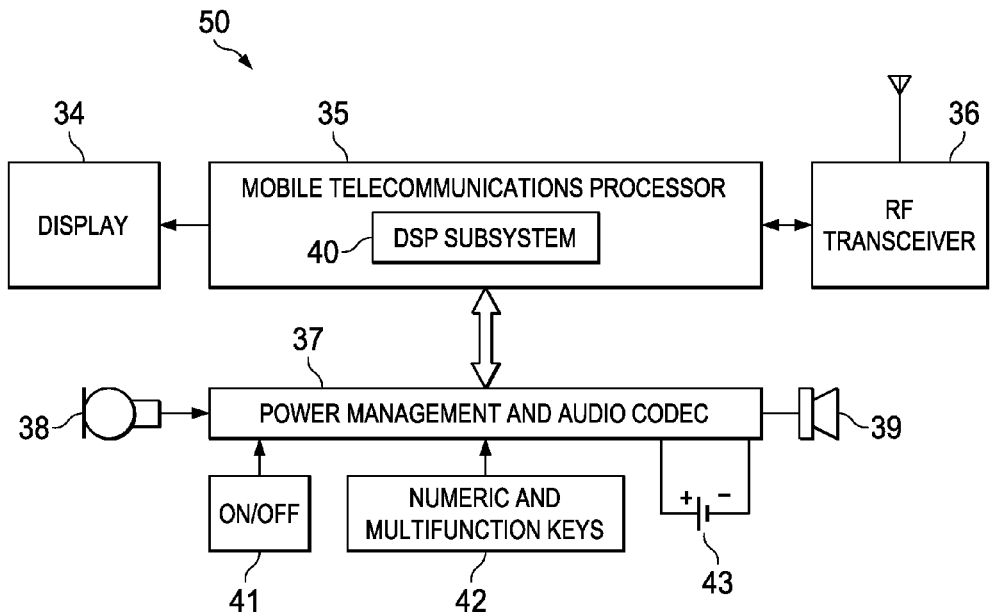
FIG. 2 is an electrical diagram, in block form, of a wireless telephone handset constructed according to the preferred embodiment of the invention.

FIG. 2 illustrates an example of the construction of wireless telephone handset 50, constructed according to the preferred embodiment of this invention. In this example, and in the context of the decoding functions carried out by the preferred embodiment of this invention, wireless telephone handset 50 operates as a transmitter and a receiver of wireless communications signals. Specifically, in one example, handset 50 is capable of both transmitting receiving "3G" mobile services. As mentioned above, these "3G" services include those referred to in connection with specifications and standards promulgated by The 3rd Generation Partnership Project ("3GPP"), which is an initiative of the European Telecommunications Standards Institute ("ETSI"). As known in the art, "3G" services include such functionality as full Internet access, downloadable and streaming video content, as well as high-fidelity voice telephone communications.

Handset 50 corresponds to a conventional wireless or cellular portable telephone, for example such a handset that is capable of receiving "3G", or "third generation" cellular services. Examples of devices that can correspond to handset 50 include cellular telephone handsets and "smartphones", such as those capable of Internet access, email and instant messaging communications, and portable video receiving and display device, along with the capability of supporting telephone services and the like. It is contemplated that those skilled in the art having reference to this specification will readily comprehend the nature of modern smartphone and telephone handset devices and systems suitable for implementation of the embodiments of this invention as described herein. As such, the architecture of handset 50 illustrated in FIG. 2 is presented at a relatively high level; even so, it is contemplated that modifications and alternatives to this architecture may be made and will be apparent to the reader, such modifications and alternatives contemplated to be within the scope of this invention as claimed.

Handset 50 in this example RF (radio frequency) transceiver 36, which is connected to and in communication with antenna A, and by way of which wireless signals are transmitted and received. As known in the art, RF transceiver 36 is constructed in the conventional manner, for example including analog and digital RF "front end" functionality, circuitry for converting RF signals to a baseband frequency, via an intermediate frequency (IF) if desired, analog and digital filtering, and other conventional circuitry useful for carrying out wireless communications over modern cellular frequencies, particularly those suited for 3 G communications. RF transceiver 36 is connected to mobile telecommunications processor 35, which performs the bulk of the digital signal processing of signals to be communicated and signals received, at the baseband frequency. One such function of mobile telecommunications processor 35 is to provide a graphics interface to display 34, for the display of text, graphics, and video to the user.

Mobile telecommunications processor 35 is also coupled to power management and audio codec function 37. Function 37 manages the power for handset 50, for example including the appropriate voltage regulator and other functions, coupled to battery 43 or to an AC adaptor, etc., and in response to on/off switch 41; in this regard, function 37 may intelligently manage the use of power by the various functions within handset 50. Function 37 also includes the codec functions for receiving and converting input audio signals, received by microphone 38, and for converting and driving audio output, via speaker 39, in the conventional manner. Keypad 42 of handset 50 is also managed by function 37, in this arrangement, or alternatively may interface directly to mobile telecommunications processor 35.

In this embodiment of the invention, mobile telecommunications processor 35 includes digital signal processor (DSP) subsystem 40. The construction of DSP subsystem 35 in connection with this preferred embodiment of the invention, will be described in further detail below. In this embodiment of the invention, DSP subsystem 40 carries out functions involved in baseband processing of the data signals to be transmitted over the wireless communications ink, and of the data signals received over that link. In that regard, this baseband processing includes encoding and decoding of the data according to an error correction code, and also digital modulation and demodulation for transmission of the encoded data, in the well-known manner for orthogonal frequency division multiplexing (OFDM) or other modulation schemes, according to the particular protocol of the communications being carried out.

Figure 3:
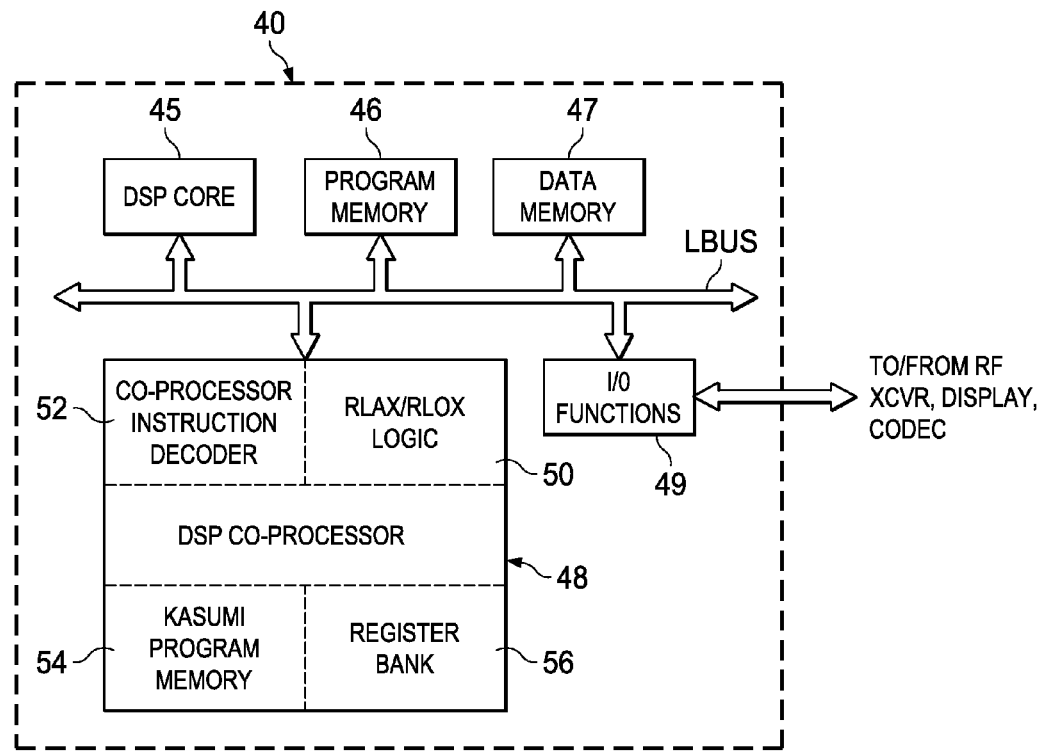
FIG. 3 is an electrical diagram, in block form, of a digital signal processor (DSP) subsystem in the handset of FIG. 2, constructed according to an embodiment of the invention.

Referring now to FIG. 3, the architecture of DSP subsystem 40 according to the preferred embodiment of the invention will now be described in further detail. According to this embodiment of the invention, DSP subsystem 40 may be realized within a single large-scale integrated circuit, or alternatively by way of two or more individual integrated circuits, depending on the available technology and system requirements.

DSP subsystem 35 includes DSP core 45, which is a full performance digital signal processor (DSP) as a member of the C64x family of digital signal processors available from Texas Instruments Incorporated. As known in the art, this family of DSPs are of the Very Long Instruction Word (VLIW) type, for example capable of pipelining on eight simple, general purpose, instructions in parallel. This architecture has been observed to be particularly well suited for operations involved in the modulation and demodulation of large data block sizes, as involved in digital communications. In this example, DSP core 45 is in communication with local bus LBUS, to which data memory resource 47 and program memory resource 46 are connected in the example of FIG. 3. Of course, data memory 47 and program memory 46 may alternatively be combined within a single physical memory resource, or within a single memory address space, or both, as known in the art; further in the alternative, data memory 47 and program memory 46 may be physically realized within DSP core 45, if desired. Input/output (I/O) functions 49 are also provided within DSP subsystem 35, in communication with DSP core 45 via local bus LBUS. Input and output operations are carried out by I/O functions 46, for example to and from codec function 37, RF transceiver 36, display 34, and the like.

According to this preferred embodiment of the invention, DSP co-processor 48 is also provided within DSP subsystem 40, and is also coupled to local bus LBUS. DSP co-processor 48 is realized by programmable logic for carrying out the iterative, repetitive, and preferably parallelized, operations involved in executing the Kasumi cipher used in the f8 confidentiality and the f9 integrity algorithms used in the 3 G communications. As such, DSP co-processor 48 appears to DSP core 45 as a traditional co-processor, which DSP core 45 accesses by forwarding to DSP co-processor 48 a higher-level instruction (e.g., DECODE) for execution, along with a pointer to data memory 47 for the data upon which that instruction is to be executed, and a pointer to data memory 47 to the destination location for the results of the decoding.

Figure 4:
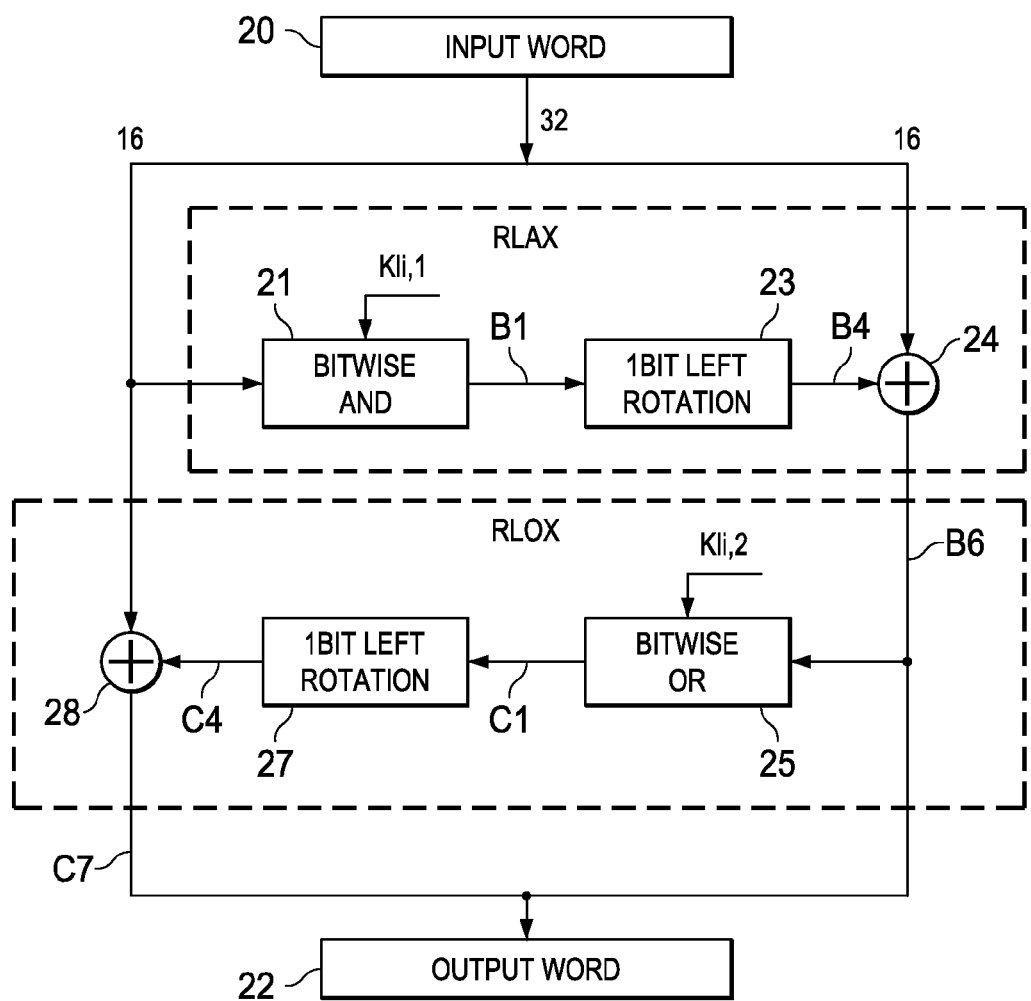
FIG. 4 is a data flow diagram illustrating the operation of the RLAX and RLOX instructions according to an embodiment of the invention.

According to this preferred embodiment of the invention, DSP co-processor 48 includes its own Kasumi program memory 54, which stores instruction sequences for carrying out the Kasumi operations in response to higher-level instructions forwarded to DSP co-processor 48 from DSP core 45. DSP co-processor 48 also includes register bank 56, or another memory resource or data store, for storing data and results of its operations. In addition, DSP co-processor 48 includes logic circuitry for fetching, decoding, and executing instructions and data involved in its Kasumi operations, also in response to the higher-level instructions from DSP core 40. For example, as shown in FIG. 4, DSP co-processor 48 includes instruction decoder 52, for decoding instructions fetched from Kasumi program memory 54. The logic circuitry contained within DSP co-processor 48 includes such arithmetic and logic circuitry necessary and appropriate for executing its instructions, and also the necessary memory management and access circuitry for retrieving and storing data from and to data memory 47, such circuitry not shown in FIG. 3 for the sake of clarity. It is contemplated that the architecture and implementation of DSP co-processor 48 may be realized according to a wide range of architectures and designs, depending on the particular need and tradeoffs made by those skilled in the art having reference to this specification. An example of a co-processor architecture well-suited for use in connection with this embodiment of the invention is described in copending and commonly assigned U.S. application Ser. No. 11/930,958, filed 31 Oct. 2007, entitled "Sign Operation Instructions and Circuitry", and incorporated herein by this reference.

According to this embodiment of the invention, DSP co-processor 48 includes RLAX/RLOX logic circuitry 50, which is circuitry specifically arranged and constructed to carry out certain functions, named RLAX and RLOX, within the FL function of the Kasumi cipher algorithm, in its executing of software instructions referring to these RLAX and RLOX functions. As noted above, these RLAX, RLOX software instructions may be stored in Kasumi program memory 54, for use upon co-processor 48 being called to execute a Kasumi instance.

FIG. 4 illustrates, in the form of a data flow diagram corresponding to the FL function performed according to the Kasumi cipher (FIG. 10, the functions that are performed upon execution of the RLAX and RLOX functions. As shown in FIG. 4, function RLAX corresponds to the bit wise AND (function 21) of the left-half sixteen-bit portion of input word 20 with the left-hand half subkey $KL_{i,1}$ with the result rotated left by one bit with wraparound (function 23) and that result exclusive-ORed with the right-hand sixteen bits of input word 20 (function 24). Function RLOX corresponds to the bit-wise OR of the result of exclusive-OR function 24 with the right-hand half subkey $KL_{i,2}$ (function 25) followed by a one-bit left rotation with wraparound (function 27), and a bit-wise exclusive-OR with the left-hand half of input word 20 (function 28).

Figure 1A:
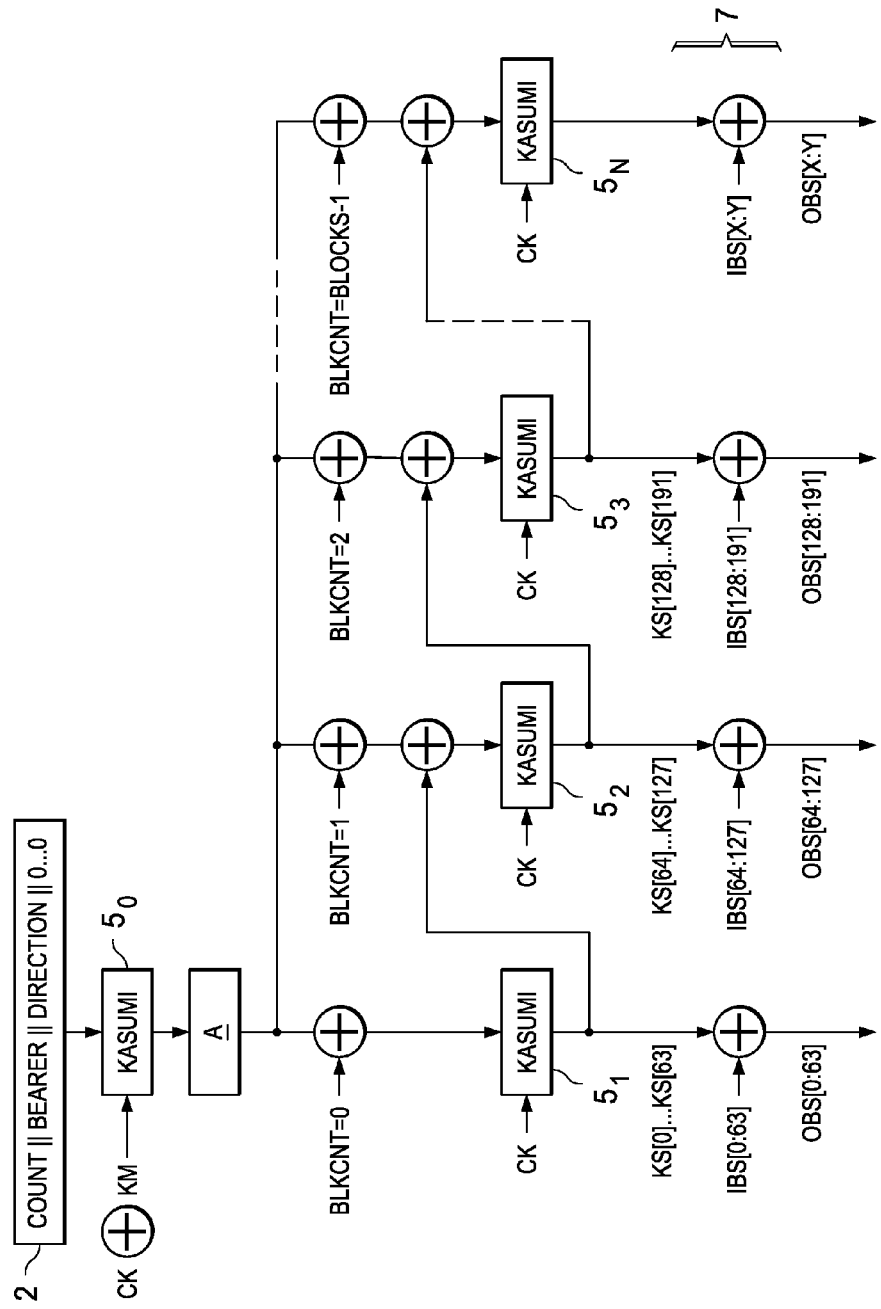
FIG. 1a is a data flow diagram of the conventional f8 confidentiality algorithm.
Figure 1B:
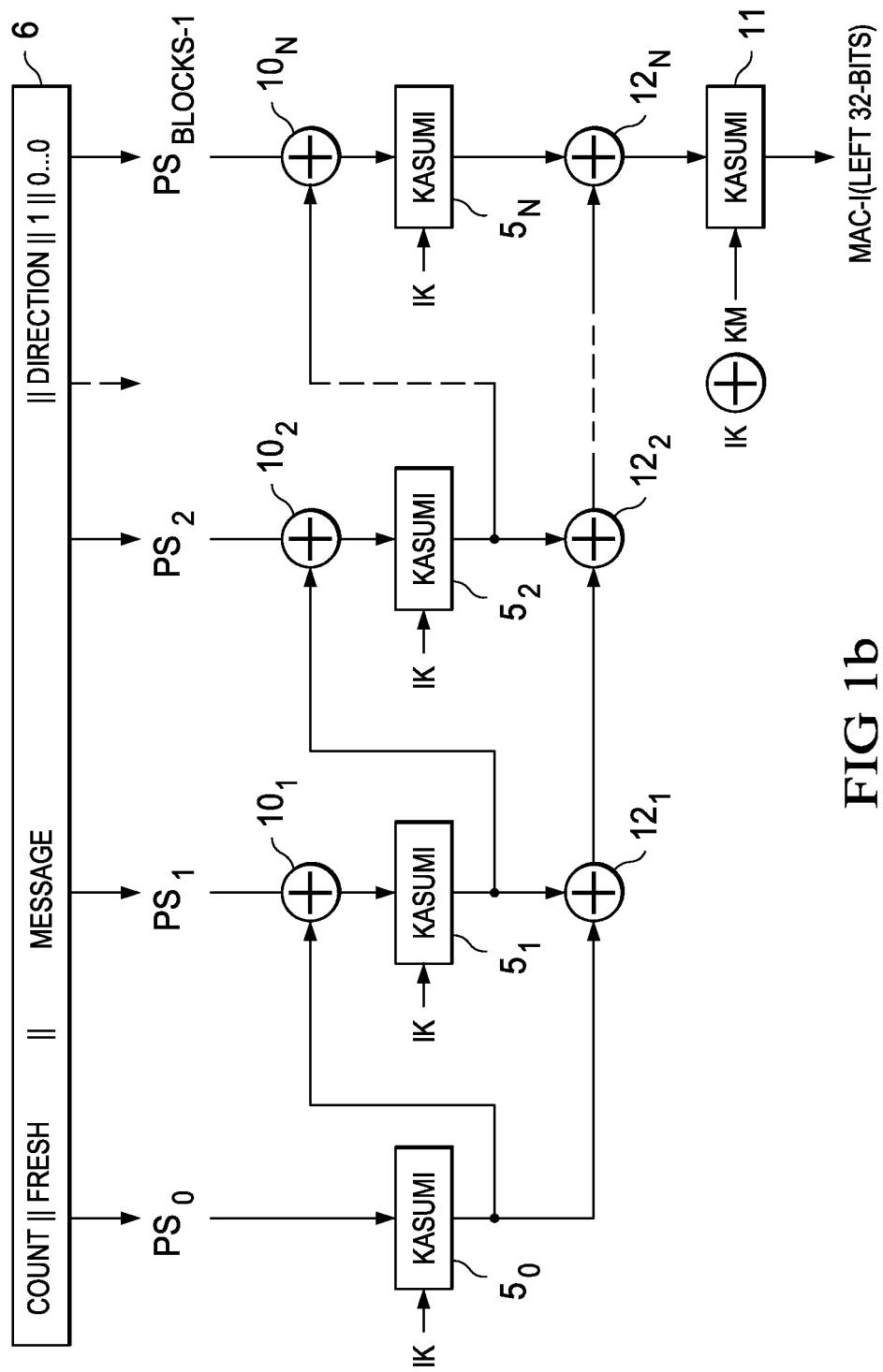
FIG. 1b is a data flow diagram of the conventional f9 integrity algorithm.
Figure 1C:
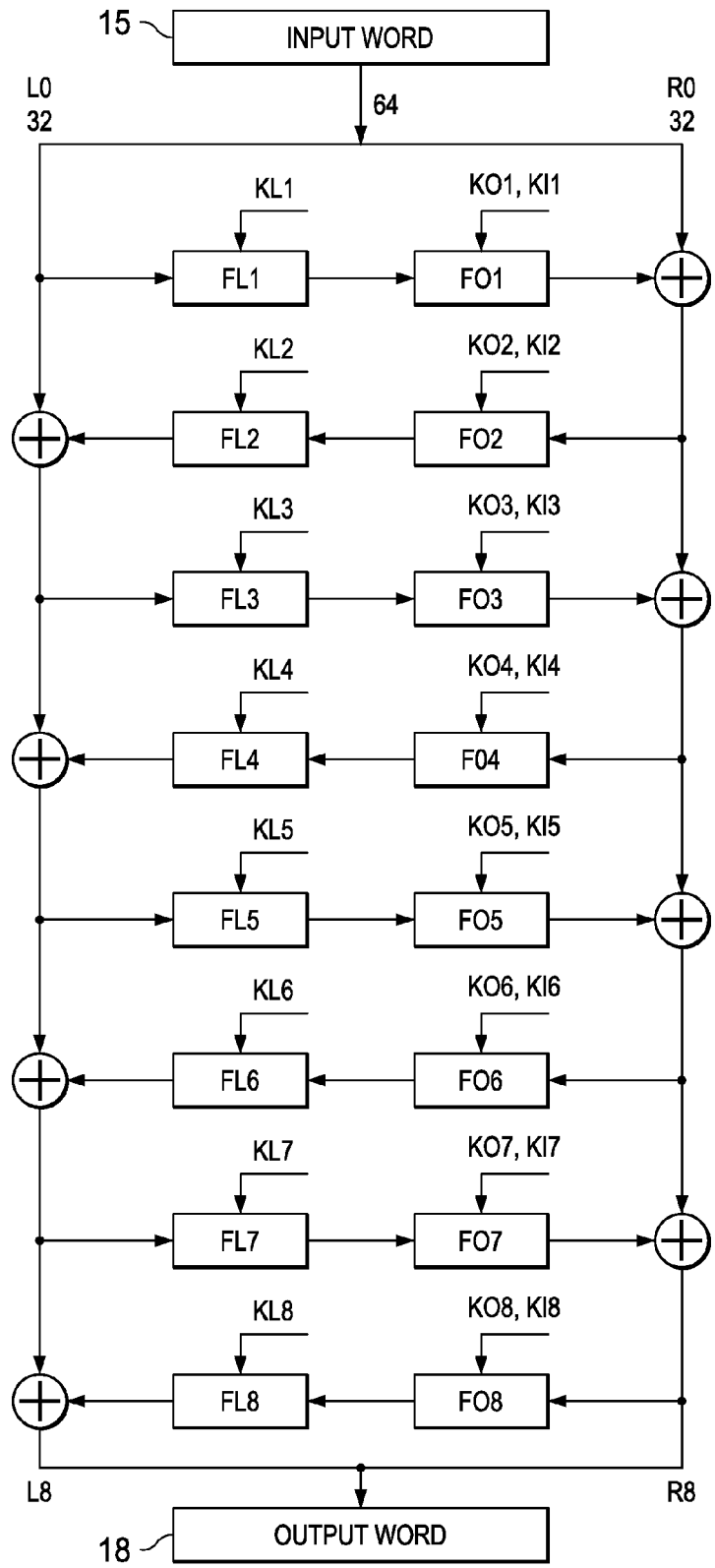
FIG. 1c is a data flow diagram illustrating the operation of the conventional Kasumi cipher.
Figure 1D:
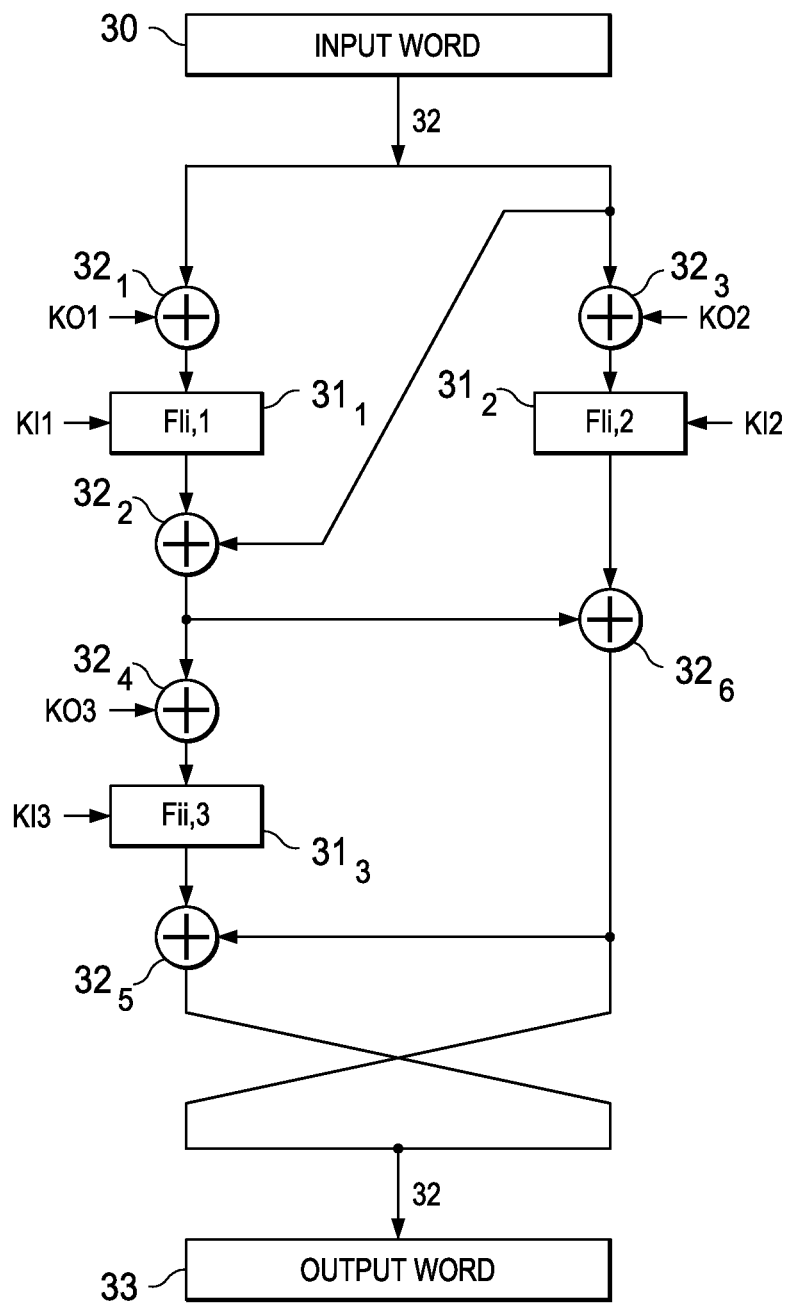
FIGS. 1d through 1f are data flow diagrams illustrating the operation of conventional functions in the Kasumi cipher.
Figure 1E:
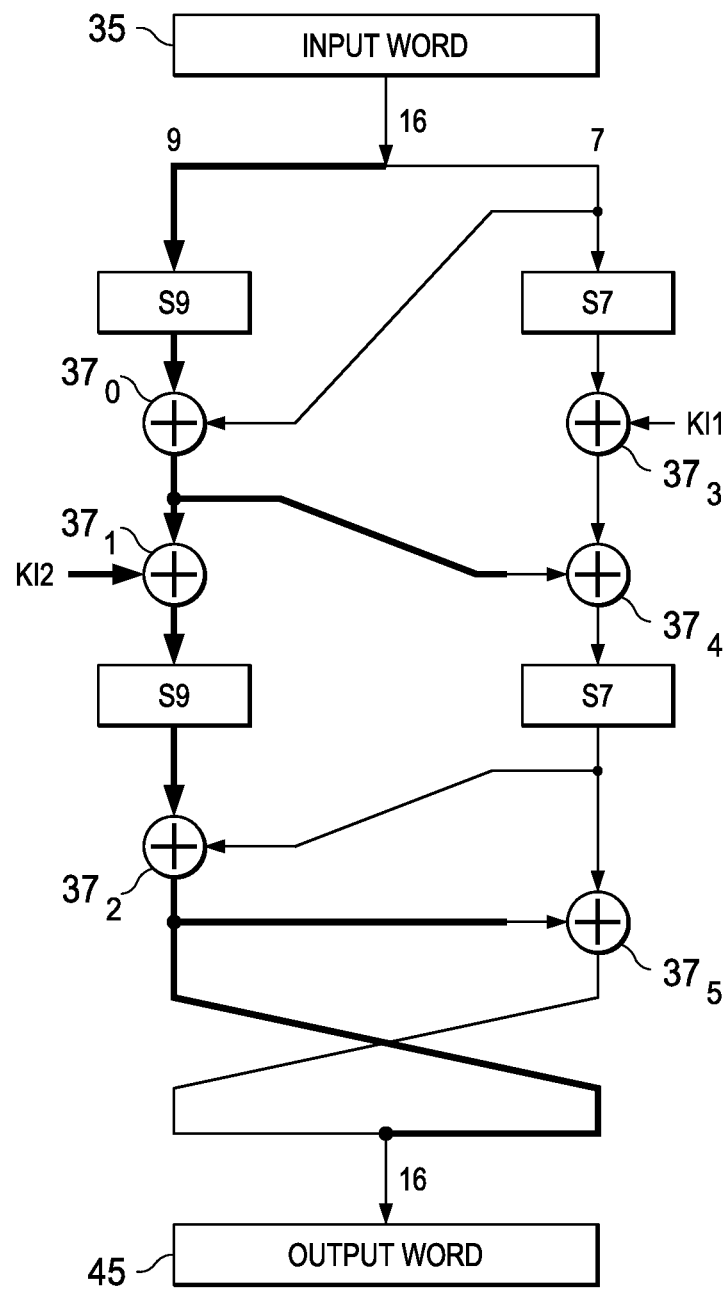
Figure 1F:
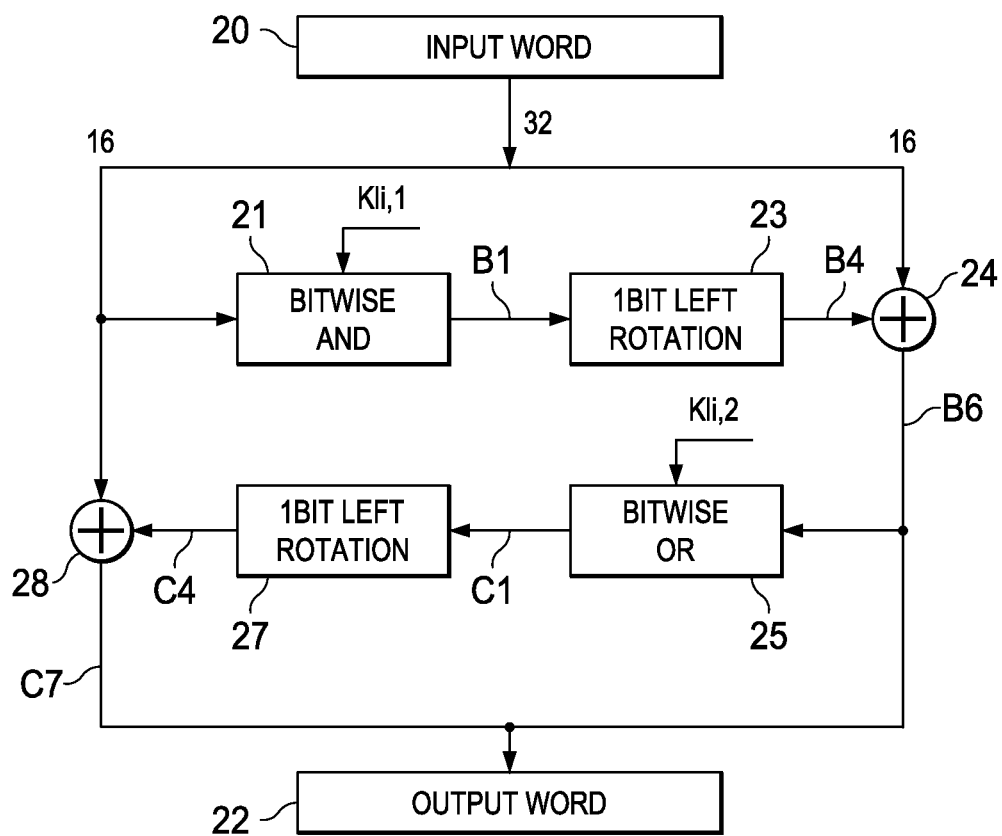

According to this embodiment of the invention, each of functions RLAX, RLOX of FIG. 4 are realized by custom RLAX/RLOX logic circuitry 50 within co-processor 48 of FIG. 3. RLAX/RLOX logic circuitry 50 is contemplated to be realized in such form that each of functions RLAX, RLOX can be executed from a single instruction, and in a minimum number of machine cycles (e.g., one machine cycle for the execute stage, for a pipelined co-processor 48). This improvement in efficiency of these functions is attained by enabling the logic functions (AND, OR, XOR, and one-bit left rotation) to be performed by custom circuitry rather than a general purpose arithmetic-logic unit (ALU) in response to specific individual RLAX, RLOX instructions, and by not requiring that the intermediate results be stored in registers, and then retrieved in order to perform the next logical operation. In this embodiment of the invention, the RLAX and RLOX instructions take the form:

RLAX src1, src2, dst
RLOX src1, src2, dst where, in each case, "src1" and "src2" are the source register locations for the input operands, and "dst" is the destination register location at which the result is to be stored. With reference to the FL function illustrated in FIGS. 1f and 4, register "src1" stores thirty-two bit input word 20, and register "src2" will store thirty-two bit subkey $KL_i$. As noted above, the RLAX and RLOX instructions are contemplated to be stored within Kasumi program memory 54, in the appropriate places in the program sequence for carrying out a Kasumi instance by way of co-processor 48.

Figure 5A:
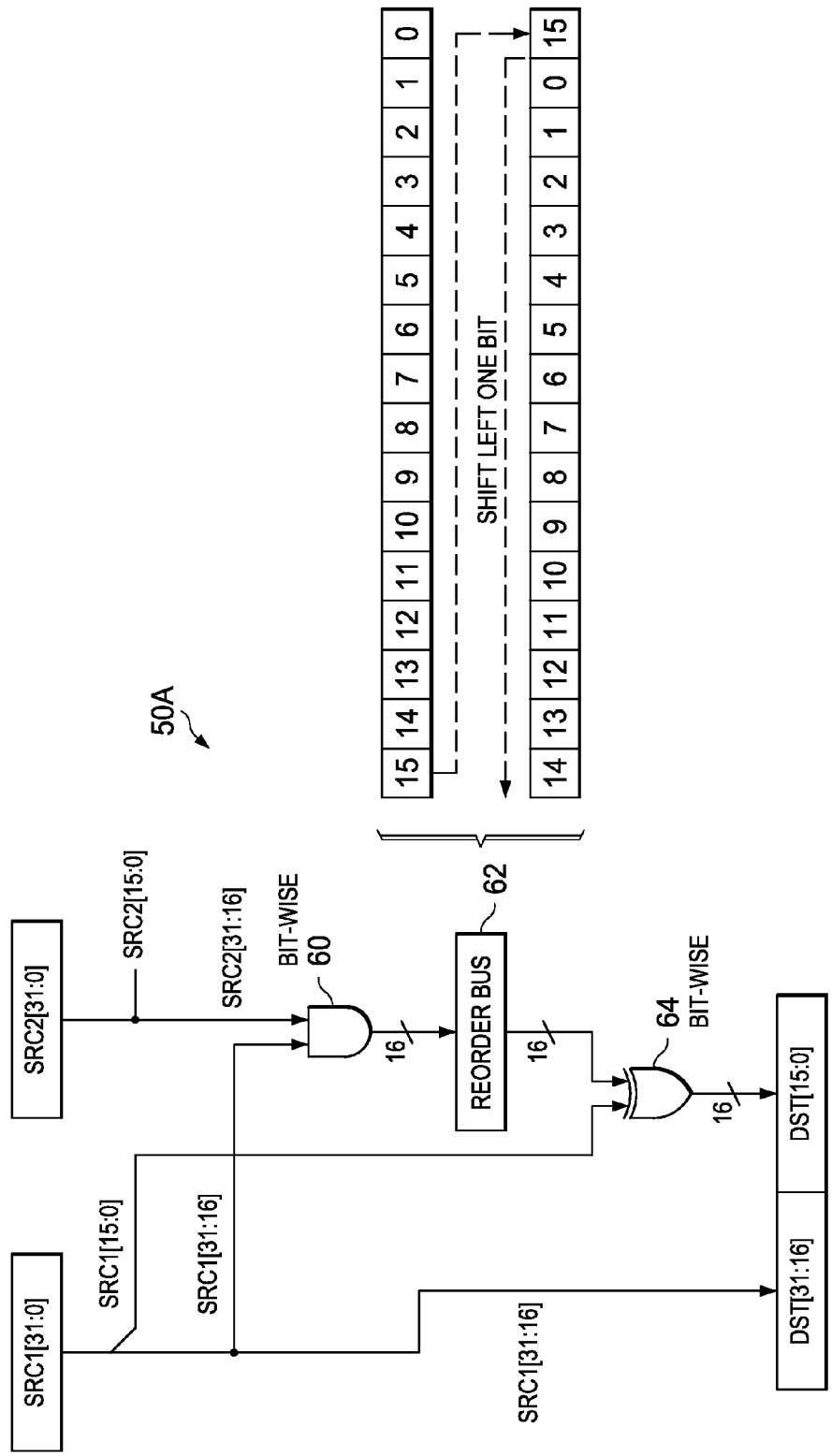
FIGS. 5a and 5b are logic diagrams illustrating the construction and operation of logic circuits for executing the RLAX and RLOX instructions, respectively, according to an embodiment of the invention.
Figure 5B:
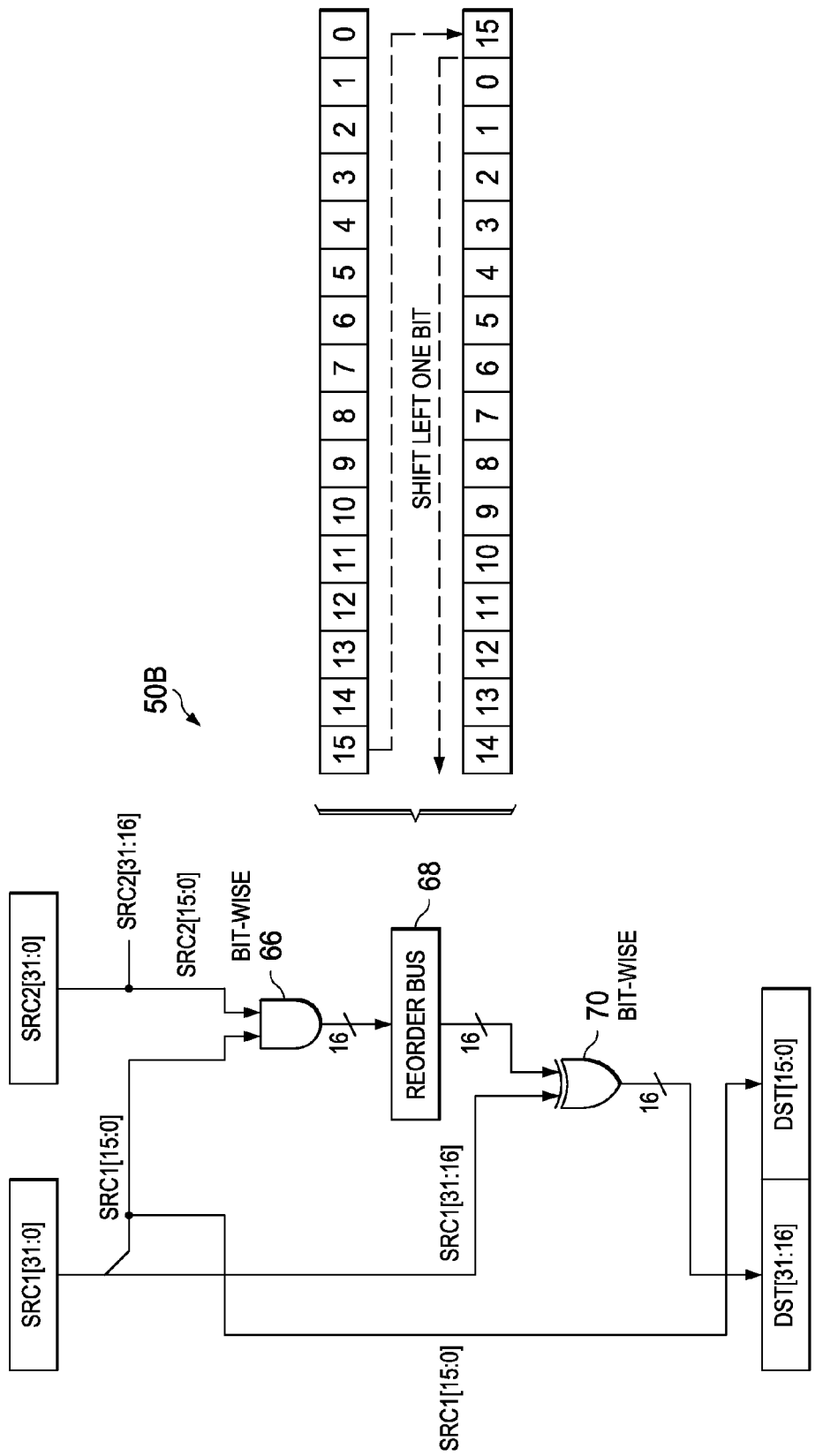

FIGS. 5a and 5b illustrate examples of the implementation of functions RLAX, RLOX, within logic circuitry 50 of co-processor 48, according to this embodiment of the invention. It is contemplated that separate custom logic circuits 50a, 50b will be provided for the RLAX and RLOX functions, respectively, as shown in FIGS. 5a and 5b. Alternatively, it is contemplated that logic circuitry 50a, 50b could be implemented by the same physical devices, with control lines controlling the various circuitry to perform the selected function. Considering that the logic circuitry necessary to perform these functions is relatively simple, however, it is contemplated that each of logic circuits 50a, 50b can be implemented separately for the two functions, without incurring undue chip area and power consumption cost.

FIG. 5a illustrates the construction of RLAX logic circuit 50a according to this embodiment of the invention. Bit-wise AND function 60 is connected to receive the most significant (left-hand) sixteen bit portion of the input words SRC1, SRC2 retrieved from the registers indicated by the source register operands "src1", "src2" of the RLAX instruction. The sixteen-bit output of bit-wise AND function 60 is communicated to a sixteen-bit input of bit-wise XOR function 64, via reorder bus 62. Reorder bus 62 refers to the set of conductors which communicate the output of AND function 60 to the input of XOR function 62, except that the conductor corresponding to the left-most (most significant) bit position at the output of AND function 60 is routed to the right-most (least significant) bit position at the corresponding input of XOR function 62. The conductors of reorder bus 62 connect each of the other bit positions at the output of AND function 60 to an input bit position at XOR function 64 that is shifted to the left by one bit position. FIG. 5a illustrates this rotate-left operation performed by reorder bus 62. XOR function 64 receives the right-most (least significant) sixteen bit portion of input word SRC1. AND function 60 and XOR function 64 are constructed in the conventional manner for bit-wise AND and XOR logic circuits, consistent with the particular manufacturing technology used to construct co-processor 48. The sixteen-bit output of XOR function 64 constitutes the right-hand (least significant) sixteen bit portion of output word DST, while the left-hand sixteen-bit portion of input word SRC1 constitutes the left-hand sixteen bit portion of output word DST; both portions of output word DST will be stored in the register location indicated by the "dst" field of the RLAX instruction.

In operation, two input words SRC1, SRC2, each thirty-two bits in length, are retrieved from the indicated source register locations ("src1", "src2", respectively) and applied to RLAX logic circuit 50a. The most-significant (left-hand) sixteen bits of each of input words SRC1, SRC2 are applied to AND function 60, which produces a sixteen-bit result that is the bit-wise logical AND of corresponding bit positions of input words SRC1, SRC2. The output of AND function 60 corresponds to the contents "B1" register in the C code for the FL function discussed above, and as shown in FIG. 4. By the action of reorder bus 62, however, the sixteen bits at the output of AND function 60 are presented to XOR function 64 in an order corresponding to a one-bit left rotation (and thus corresponding to register contents B4 of the C code discussed above). XOR function 64 performs a bit-wise exclusive-OR between this rotated result and the least significant portion of input word SRC1, to create the least-significant portion of the destination result DST (which corresponds to the register contents B6 in the data flow of FIG. 4). The most significant portion of input word SRC1 is maintained, in the most significant portion of the destination result DST; as evident in FIG. 4, this portion of input word 20 is applied without modification to an exclusive-OR function 28 in the RLOX instruction.

The construction and operation of logic circuit 50b for performing the RLOX function is similar to that of logic circuit 50a, with the exception that different operand portions are used, and that a bit-wise OR is performed rather than a bit-wise AND. As shown in FIG. 5b, bit-wise OR function 66 has its inputs connected to receive the least significant (right-hand) sixteen bit portion of each of the input words SRC1, SRC2; again, input words SRC1, SRC2 are the contents of the registers indicated by the source register operands "src1", "src2" of the RLOX instruction. The sixteen-bit output of OR function 66 is communicated to a sixteen-bit input of bit-wise XOR function 70, via reorder bus 68. Reorder bus 68 is constructed of sixteen conductors that communicate the left-most (most significant) bit position at the output of OR function 66 to the right-most (least significant) bit position at the corresponding input of XOR function 70, and that communicate the other bit positions at the output of OR function 66 to the input bit position at XOR function 70 shifted to the left by one bit position. XOR function 70 receives the left-hand (most significant) sixteen bit portion of input word SRC1 at its other. OR function 66 and XOR function 70 are constructed in the conventional manner for bit-wise OR and XOR logic circuits for the applicable manufacturing technology. The sixteen-bit output of XOR function 70 constitutes the left-hand (most significant) sixteen bit portion of output word DST, while the right-hand sixteen-bit portion of input word SRC1 constitutes the right-hand sixteen bit portion of output word DST, which will both be be stored in the register location indicated by the "dst" field of the RLOX instruction.

In operation, two input words SRC1, SRC2, each thirty-two bits in length, are retrieved from the indicated source register locations ("src1", "src2", respectively) and applied to RLOX logic circuit 50b. The least-significant (right-hand) sixteen bits of each of input words SRC1, SRC2 are applied to OR function 66, which in turn produces a sixteen-bit result that is the bit-wise logical OR of the corresponding bit positions of input words SRC1, SRC2. The output of OR function 66 corresponds to the contents of the C1 register in the C code for the FL function discussed above and shown in FIG. 4. Reorder bus 68 applies a one-bit rotate left to the output of OR function 66, with the rotated contents presented to XOR function 70 (corresponding to the contents of register C4). XOR function 70 performs a bit-wise exclusive-OR between this rotated result and the most significant portion of input word SRC1, to create the most-significant portion of the destination result DST (i.e., register contents C7 in the data flow of FIG. 4). The least significant portion of input word SRC1 is maintained in the least significant portion of the destination result DST. This value will be applied without modification to exclusive-OR function 24 in the next instance of the RLAX instruction.

Figure 6A:
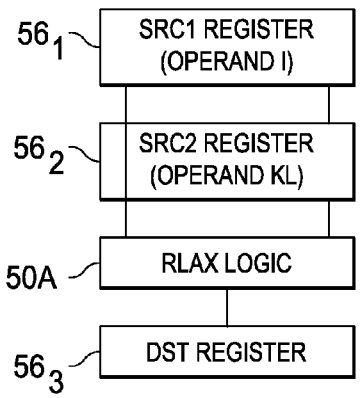
FIGS. 6a and 6b are register-level diagrams illustrating the execution operation of the RLAX and RLOX instructions, respectively, according to an embodiment of the invention.
Figure 6B:
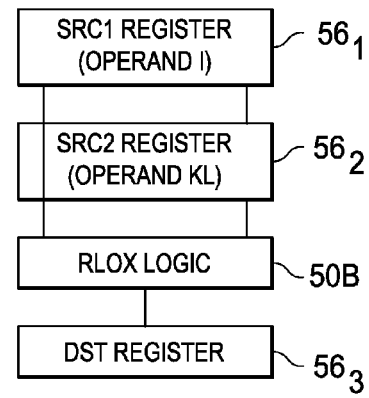

FIGS. 6a and 6b illustrate the operation of the RLAX and RLOX instructions according to this preferred embodiment of the invention, as register-level diagram. Referring to FIG. 6a for the case of the RLAX instruction, input word operand I is stored in a first source register $56_1$ in register bank 56 of co-processor 48, and subkey operand KL is stored in a second source register $56_2$ in that register bank 56. These two registers $56_1$, $56_2$ provide their contents to RLAX logic circuit 50a, which produces an output word that is forwarded to destination register $56_3$, also in register bank 56. FIG. 6b is similarly arranged for the case of the RLOX instruction. It is contemplated that the machine cycle latency of each of the RLAX and RLOX operations will be no more than one machine cycle, assuming that co-processor 48 has reasonable pipelining.

According to this embodiment of the invention, it is contemplated that the implementation of the FL function by way of the RLAX, RLOX instructions and the corresponding logic circuits 50a, 50b will provide important efficiencies in the processing of data being transmitted and received according to the Kasumi cipher, for example the f8 and f9 confidentiality and integrity algorithms used according to the 3G standard. Specifically, the RLAX and RLOX instructions provide the capability of performing the FL function by executing a sequence of two instructions, which is a substantial improvement over the sixteen instruction sequence required for the FL function as conventionally executed by a C64x DSP core. Considering that one FL function is executed in each "round" of the Kasumi algorithm (FIG. 1c), this embodiment of the invention reduces the number of instructions required for performing a single Kasumi cipher from 392 instructions, in the conventional C64x implementation, to 280 instructions (i.e., (2+33)*8 instructions), thus reducing the number of instructions executed by 112 instructions for each Kasumi cipher. Considering that 314 instances of the Kasumi cipher are required to process the f8 and f9 algorithms for a message of typical length, this reduces the total instruction execution count by 35,168 instructions. For a co-processor or DSP core that operates according to some reasonable degree of pipelining, this reduction in instruction execution count translates directly into a substantial saving of machine cycles. Not only is the latency time much reduced and the performance increased according to this embodiment of the invention, therefore, but the power consumed in carrying out the 3 G communications is also substantially reduced. Power savings are especially critical in the intended use of this embodiment of the invention in handset 50 or other battery-powered systems.

As described above, RLAX and RLOX logic circuits 50a, 50b are described as operating on thirty-two-bit digital words, one at a time. However, many modern DSP integrated circuits and other programmable logic have much wider datapaths than sixteen bits. For example, it is contemplated that some modern processors, including DSPs, have or will realized data paths as wide as 128 bits for each data word, covering four thirty-two-bit data words.

Figure 6C:
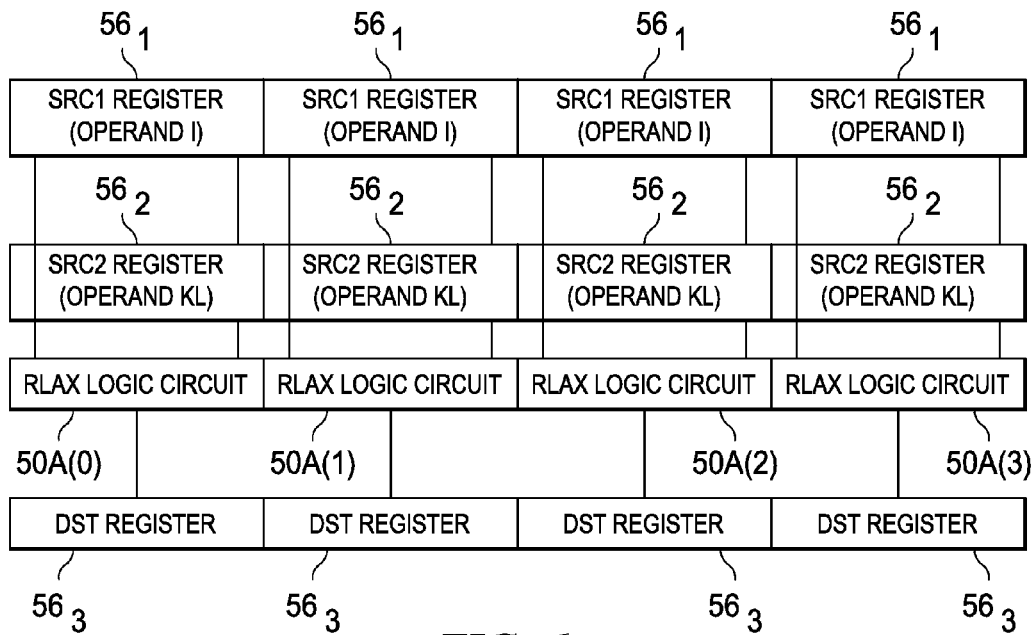
FIG. 6c is a register-level diagram illustrating a parallelized implementation of the RLAX logic circuit, according to an embodiment of the invention.

It has been discovered, according to this preferred embodiment of the invention, that the executable operations for applying the Kasumi cipher, including the RLAX and RLOX functions, can be readily parallelized in those cases in which the input words applied to the RLAX and RLOX functions are independent and not affected by other data values. For example, the Kasumi cipher may be applied to multiple data blocks at the same time. Accordingly, RLAX/RLOX logic circuitry 50 of co-processor 48 can be realized by way of four parallel RLAX logic circuits 50a, and four parallel RLOX logic circuits 50b, each operating independently on their own individual thirty-two-bit data words and subkeys. FIG. 6c illustrates this parallelism, in a register-level diagram for the case of the RLAX logic circuits 50a; the four parallel RLOX logic circuits 50b will, of course, be implemented in a similar manner. In this regard, it is contemplated that register bank 56 can include register locations that are as wide (e.g., 128 bits) as the four data words to be operated upon, such that one register location $56_1$ can serve as the src1 register location containing operand I for each of the four RLAX operations, and one register location $56_2$ can serve as the src2 register location containing subkey operand KL for those operations. The result of the RLAX instruction as executed by RLAX logic circuits 50a(0) through 50a(3), for each of the four operations, is then stored in a single destination register (DST) location $56_3$ in register bank 56.

It is also contemplated that this parallelism can be easily generalized for other data word widths fitting within the ultra-wide data path. It is contemplated that the logic involved in selectably combining RLAX, RLOX logic circuits 50a, 50b can be readily derived by those skilled in the art having reference to this specification, for a given desired data path width, operand precision, and number of operations to be performed in parallel.

According to these parallelized arrangements illustrated in FIGS. 6a through 6c and described above, it is contemplated that additional benefit can be derived from such parallelism provided by this invention, in combination with the Kasumi cipher of large and numerous data blocks, as are now being used in modern 3 G communications. Specifically, the f8 and f9 algorithms under the 3GPP standard can improve its efficiency by another factor of four, by use of the parallelized arrangements of FIGS. 6a through 6c. Again, assuming 314 Kasumi instances for a data block, this parallelism would reduce the number of cycles for executing the f8 and f9 algorithms for four data blocks in parallel from 492,352 instruction cycles (4 data blocks*314 Kasumi instances*8 rounds*49 instruction cycles) to 87,920 instruction cycles (4 data blocks*314 Kasumi instances*8 rounds*49 instruction cycles, all divided by a parallel factor of 4), which is an 82.1% reduction. Those skilled in the art having reference to this specification will readily appreciate that this invention may be readily realized in other computing architectures, and will be useful in connection with a wide range of applications and uses. The detailed description provided in this specification will therefore be understood to be presented by way of example only.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. Programmable digital logic circuitry, comprising:
   program memory for storing a plurality of program instructions arranged in a sequence, the plurality of program instructions comprising a first program instruction corresponding to a function of a first and a second operand, the function returning a value corresponding to a data word having a first portion corresponding to a first portion of the first operand, and a second portion corresponding to the result of a sequence of operations comprising:
      performing a bit-wise AND function of the first portion of the first operand and a first portion of the second operand;
      then performing a one-bit left rotate of the result of the bit-wise AND function; and
      then performing a bit-wise exclusive-OR of the result of the one-bit left rotate and the second portion of the first operand;
   a register bank comprising register locations for storing the operands and the returned value; and
   a first logic circuit for executing the first program instruction upon the first and second operands stored in the register bank, wherein the first logic circuit comprises:
      a plurality of logic blocks, each of the logic blocks for executing the first program instruction upon a pair of operands stored in the register bank;
      wherein each of the first and second register locations of the register bank store a plurality of operands;
      and wherein, in executing the first program instruction, a plurality of operands from the first and second register locations of the register bank are applied to corresponding ones of the plurality of the logic blocks, so that the plurality of logic blocks each return a value corresponding to the result of the sequence of operations.

2. The circuitry of claim 1, wherein the first program instruction specifies first and second source register locations of the register bank at which the first and second operands, respectively, are stored, and specifies a destination register at which the returned value is to be stored.

3. Programmable digital logic circuitry, comprising:
   program memory for storing a plurality of program instructions arranged in a sequence, the plurality of program instructions comprising a first program instruction corresponding to a function of a first and a second operand, the function returning a value corresponding to a data word having a first portion corresponding to a first portion of the first operand, and a second portion corresponding to the result of a sequence of operations comprising:
      performing a bit-wise AND function of the first portion of the first operand and a first portion of the second operand;
      then performing a one-bit left rotate of the result of the bit-wise AND function; and
      then performing a bit-wise exclusive-OR of the result of the one-bit left rotate and the second portion of the first operand;
   a register hank comprising register locations for storing the operands and the returned value; and
   a first logic circuit for executing the first program instruction upon the first and second operands stored in the register bank, wherein the first logic circuit comprises:
      a bit-wise AND logic function;
      a bit-wise exclusive-OR logic function; and
      a reorder bus, comprised of a plurality of conductors, each associated with a bit position of the output of the bit-wise AND logic function and with a bit position of the input of the bit-wise exclusive-OR logic function, one of the conductors routing the most significant bit position of the output of the bit-wise AND logic function to the least significant bit position of the input of the bit-wise exclusive-OR logic function, and the other conductors routing each of the corresponding bit positions of the output of the bit-wise AND logic function to a next most significant bit position of the input of the bit-wise exclusive-OR logic function.

4. The circuitry of claim 1, wherein the plurality of program instructions further comprises a second program instruction corresponding to second function of a first and second operand, the second function returning a value corresponding to a data word having a second portion corresponding to a second portion of the first operand, and a first portion corresponding to the result of a sequence of operations comprising:
   performing a bit-wise OR function of the second portion of the first operand and a second portion of the second operand;
   then performing a one-bit left rotate of the result of the bit-wise OR function; and
   then performing a bit-wise exclusive-OR of the result of the one-bit left rotate and a first portion of the first operand.

5. Programmable digital logic circuitry, comprising:
program memory for storing a plurality of program instructions arranged in a sequence, the plurality of program instructions comprising a first program instruction corresponding to a function of a first and a second operand, the function returning a value corresponding to a data word having a first portion corresponding to a first portion of the first operand, and a second portion corresponding to the result of a sequence of operations comprising:
performing a bit-wise AND function of the first portion of the first operand and a first portion of the second operand;
then performing a one-bit left rotate of the result of the bit-wise AND function; and
then performing a bit-wise exclusive-OR of the result of the one-bit left rotate and the second portion of the first operand;
a register bank comprising register locations for storing the operands and the returned value; and
a first logic circuit for executing the first program instruction upon the first and second operands stored in the register bank, wherein the first logic circuit comprises:
a bit-wise OR logic function;
a hit-wise exclusive-OR logic function; and
a reorder bus, comprised of a plurality of conductors, each associated with a bit position of the output of the bit-wise OR logic function and with a bit position of the input of the bit-wise exclusive-OR logic function, one of the conductors routing the most significant bit position of the output of the bit-wise OR logic function to the least significant bit position of the input of the bit-wise exclusive-OR logic function, and the other conductors routing each of the corresponding bit positions of the output of the bit-wise OR logic function to a next most significant bit position of the input of the bit-wise exclusive-OR logic function.

6. The circuitry of claim 1, further comprising:
a plurality of the first logic circuits arranged in parallel with one another, for simultaneously executing the first program instruction upon first and second operands associated with a plurality of data blocks.

7. Programmable digital logic circuitry, comprising:
program memory for storing a plurality of program instructions arranged in a sequence, the plurality of program instructions comprising a first program instruction corresponding to a function of a first and a second operand, the function returning a value corresponding to a data word having a first portion corresponding to a first portion of the first operand, and a second portion corresponding to the result of a sequence of operations comprising:
performing a bit-wise OR function of the second portion of the first operand and a second portion of the second operand;
then performing a one-bit left rotate of the result of the bit-wise OR function; and
then performing a bit-wise exclusive-OR of the result of the one-bit left rotate and a first portion of the first operand;
a register bank comprising register locations for storing the operands and the returned value; and
a first logic circuit for executing the first program instruction upon the first and second operands stored in the register bank, wherein the first logic circuit comprises:
a plurality of logic blocks, each of the logic blocks for executing the first program instruction upon a pair of operands stored in the register bank;
wherein each of the first and second register locations of the register bank store a plurality of operands;
and wherein, in executing the first program instruction, a plurality of operands from the first and second register locations of the register bank are applied to corresponding ones of the plurality of the logic blocks, so that the plurality of logic blocks each return a value corresponding to the result of the sequence of operations.

8. The circuitry of claim 7, wherein the first program instruction specifies first and second source register locations of the register bank at which the first and second operands, respectively, are stored, and specifies a destination register at which the returned value is to be stored.

9. Programmable digital logic circuitry, comprising:
program memory for storing a plurality of program instructions arranged in a sequence, the plurality of program instructions comprising a first program instruction corresponding to a function of a first and a second operand, the function returning a value corresponding to a data word having a first portion corresponding to a first portion of the first operand, and a second portion corresponding to the result of a sequence of operations comprising:
performing a bit-wise OR function of the second portion of the first operand and a second portion of the second operand;
then performing a one-bit left rotate of the result of the bit-wise OR function; and
then performing a bit-wise exclusive-OR of the result of the one-bit left rotate and a first portion of the first operand;
a register bank comprising register locations for storing the operands and the returned value; and
a first logic circuit for executing the first program instruction upon the first and second operands stored in the register bank, wherein the first logic circuit comprises:
a bit-wise OR logic function;
a bit-wise exclusive-OR logic function; and
a reorder bus, comprised of a plurality of conductors, each associated with a bit position of the output of the bit-wise OR logic function and with a bit position of the input of the bit-wise exclusive-OR logic function, one of the conductors routing the most significant bit position of the output of the bit-wise OR logic function to the least significant bit position of the input of the bit-wise exclusive-OR logic function, and the other conductors routing each of the corresponding bit positions of the output of the bit-wise OR logic function to a next most significant bit position of the input of the bit-wise exclusive-OR logic function.

10. The circuitry of claim 7, further comprising:
a plurality of the first logic circuits arranged in parallel with one another, for simultaneously executing the first program instruction upon first and second operands associated with a plurality of data blocks.

11. A method of operating logic circuitry to execute a first program instruction to return an output value, based on first and second operands stored at source locations specified by the first program instruction, comprising the steps of:
retrieving the first and second operands from the specified locations;

performing a bit-wise AND function of the first portion of the first operand and a first portion of the second operand;

then performing a one-bit left rotate of the result of the bit-wise AND function, comprising:

routing the most significant bit position of the result of the bit-wise AND function to the least significant bit position of an input of the bit-wise exclusive-OR function; and routing the other corresponding bit positions of the result of the bit-wise AND function to a next most significant bit position of the input of the bit-wise exclusive-OR function;

then performing a bit-wise exclusive-OR of the result of the one-bit left rotate and the second portion of the first operand; and returning a first output value having a first portion corresponding to the first portion of the first operand, and a second portion corresponding to the result of the bit-wise exclusive-OR.

12. The method of claim 11, further comprising:
storing the first output value at a destination location specified by the first program instruction.

13. The method of claim 12, wherein the source locations and the destination location are registers in a register bank.

14. The method of claim 11, further comprising:
executing a second program instruction, by performing a sequence of operations comprising:
performing a bit-wise OR function of a second portion of the first output value and a second portion of the second operand;
then performing a one-bit left rotate of the result of the bit-wise OR function;
then performing a bit-wise exclusive-OR of the result of the one-bit left rotate and a first portion of the first operand; and
returning a second output value having a first portion corresponding to the result of the bit-wise exclusive-OR, and a second portion corresponding to the second portion of the first operand.

15. The method of claim 9, wherein the method executes the first program instruction simultaneously on first and second operands associated with a plurality of data blocks.

16. A method of operating logic circuitry to execute a first program instruction to return an output value, based on first and second operands stored at source locations specified by the first program instruction, comprising the steps of:
retrieving the first and second operands from the specified locations;
performing a bit-wise AND function of the first portion of the first operand and a first portion of the second operand;
then performing a one-bit left rotate of the result of the bit-wise AND function, comprising:
routing the most significant bit position of the result of the bit-wise OR function to the least significant bit position of an input of the bit-wise exclusive-OR function; and
routing the other corresponding bit positions of the result of the bit-wise OR function to a next most significant bit position of the input of the bit-wise exclusive-OR function;

then performing a bit-wise exclusive-OR of the result of the one-bit left rotate and the second portion of the first operand; and returning a first output value having a first portion corresponding to the first portion of the first operand, and a second portion corresponding to the result of the bit-wise exclusive-OR.

17. The method of claim 16, further comprising:
storing the output value at a destination location specified by the first program instruction.

18. The method of claim 17, wherein the source locations and the destination location are registers in a register bank.

19. The method of claim 16, wherein the method executes the first program instruction simultaneously on first and second operands associated with a plurality of data blocks.

20. The circuitry of claim 1 wherein the function is an RLAX function.

21. The circuitry of claim 4 wherein the second function is an RLOX function.

22. The circuitry of claim 3 wherein the function is an RLAX function.

23. The circuitry of claim 3, wherein the first program instruction specifies first and second source register locations of the register bank at which the first and second operands, respectively, are stored, and specifies a destination register at which the returned value is to be stored.

24. The circuitry of claim 3, further comprising:
a plurality of the first logic circuits arranged in parallel with one another, for simultaneously executing the first program instruction upon first and second operands associated with a plurality of data blocks.

25. The circuitry of claim 5 wherein the function is an RLAX function.

26. The circuitry of claim 5, wherein the first program instruction specifies first and second source register locations of the register bank at which the first and second operands, respectively, are stored, and specifies a destination register at which the returned value is to be stored.

27. The circuitry of claim 5, further comprising:
a plurality of the first logic circuits arranged in parallel with one another, for simultaneously executing the first program instruction upon first and second operands associated with a plurality of data blocks.

28. The circuitry of claim 7 wherein the function is an RLOX function.

29. The circuitry of claim 9 wherein the function is an RLOX function.

30. The circuitry of claim 9, wherein the first program instruction specifies first and second source register locations of the register bank at which the first and second operands, respectively, are stored, and specifies a destination register at which the returned value is to be stored.

31. The circuitry of claim 9, further comprising:
a plurality of the first logic circuits arranged in parallel with one another, for simultaneously executing the first program instruction upon first and second operands associated with a plurality of data blocks.

* * * * *